Jan. 25, 1944.  N. D. GRISWOLD ET AL  2,339,923
WATER FEEDING DEVICE FOR CEMENT MIXERS
Filed March 3, 1941  2 Sheets-Sheet 1

INVENTORS
NELSON D. GRISWOLD
WILLIAM J. ZILER
BY
Griswold & Burdick
ATTORNEYS

INVENTORS
NELSON D. GRISWOLD
WILLIAM J. ZILER
BY
ATTORNEYS

Patented Jan. 25, 1944

2,339,923

UNITED STATES PATENT OFFICE 2,339,923

WATER FEEDING DEVICE FOR CEMENT MIXERS

Nelson D. Griswold and William J. Ziler, Midland, Mich., assignors to The Dow Chemical Company, Midland, Mich., a corporation of Michigan Application March 3, 1941, Serial No. 381,510

5 Claims. (Cl. 221—106)

The invention relates to a device for controlling the delivery of water to cement mixers of the general type employed for producing a neat cement slurry such as is used in oil well cementing practices.

In oil field cementing operations a satisfactory cement mixing apparatus must be extremely flexible as regards its ability to produce neat cement slurry at widely varying rates. For example, in some instances it is desirable to supply to the well a neat cement slurry of a predetermined and closely controlled density at a nearly constant rate of approximately three tons a minute, while in other instances the amount of neat slurry that can be used may not exceed a few hundred pounds a minute. The need for large volumes of cement slurry at such a rapid rate usually arises in connection with cementing deep wells having a high bottom hole temperature, making it imperative that a large volume of cement be quickly placed before the heat begins to effect a premature set of the cement. In making cement slurries of closely controlled density in a continuous manner and at widely varying rates, it is essential that the mixing water be delivered to the cement mixing chamber in a manner susceptible of accurate regulation at widely varying rates, for otherwise the density of the mixed slurry will vary widely and, as a consequence, the slurry will have unsatisfactory strength properties.

It is, therefore, the principal object of the invention to provide a device capable of delivering water to the mixing chamber of a cement mixer in a controllable and positive manner at widely varying rates.

Another object of the invention is to provide a water-feeding device of the rotary valve type which may be driven at widely varying speeds and yet be capable of delivering an amount of water directly proportional to the speed of rotation.

In the accompanying drawings, which illustrate an embodiment of the invention:

Figures 1, 4:
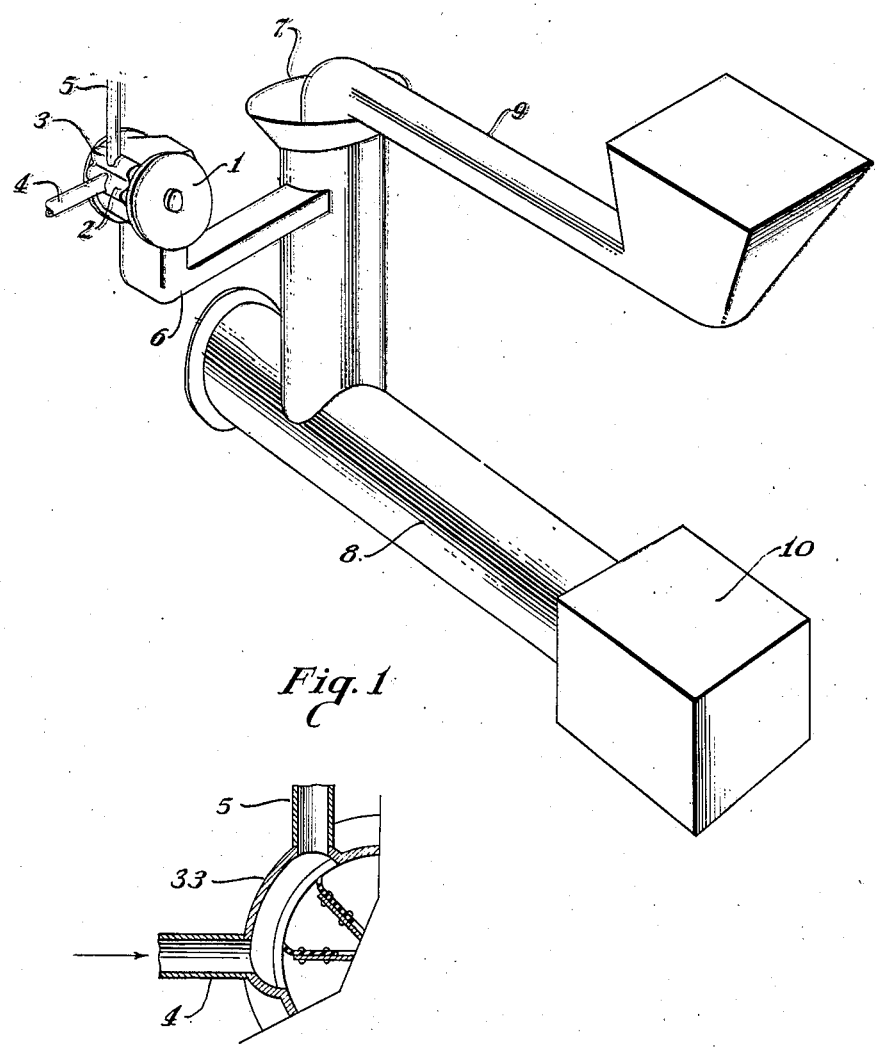
Fig. 1 is a perspective view of a somewhat diagrammatic nature showing the water-feeding device associated in an operable manner with a cement-mixing apparatus.
Fig. 4 is an elevational view along lines 4—4 of Fig. 2 showing, however, a slightly modified structure.

In a more detailed description of the drawings, Fig. 1 shows the water-feeding device 1 provided with water and air manifolds 2 and 3. A water supply line 4 communicates with manifold 2, while air stack 5 communicates with the manifold 3. The water discharged from the feeding device is carried through a suitable conduit 6 to the hopper 7, which is in communication with the mixing chamber 8, where water and dry cement are intimately mixed by conventional mixing blades (not shown). Suitable means, designated generally by numeral 9, are provided for forwarding cement to the hopper 7, from whence it falls into the mixing chamber. Such forwarding means may conveniently be a screw flight conveyer. The mixing chamber 8 may be provided at one end with an enlarged inventory chamber 10, into which mixed slurry is discharged preparatory to pumping it to the desired point.

Figure 3:
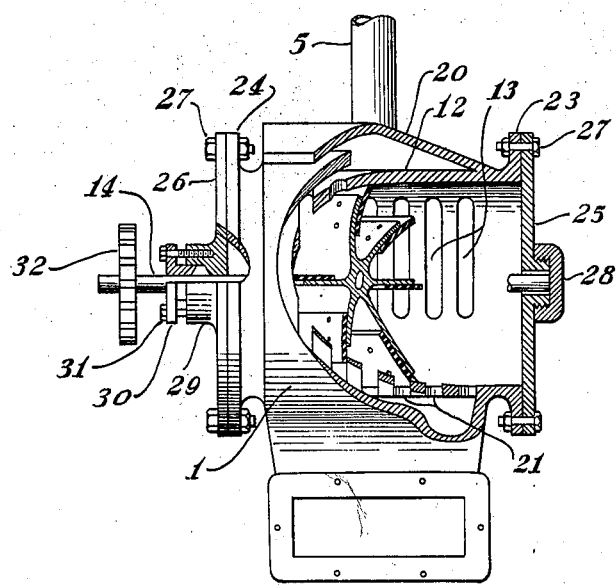
Fig. 3 is a side elevational view broken away to show various levels partly in cross section.
Figure 2:
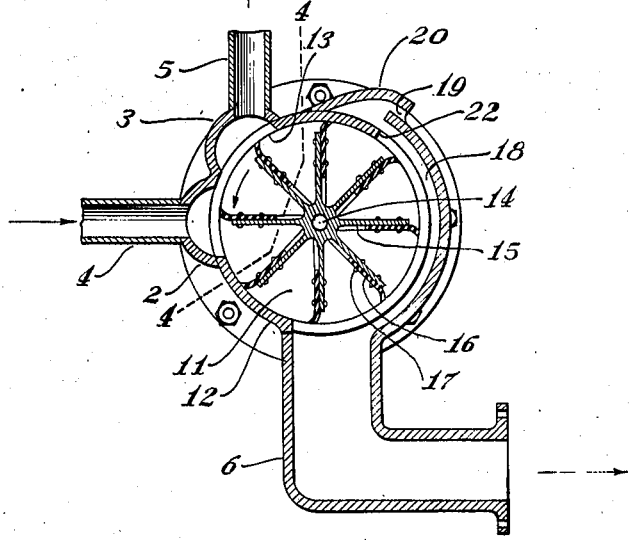
Fig. 2 is an elevational view of the water-feeding device in vertical cross section and in a plane perpendicular to the axis of rotation of the valve.

The detailed construction of the water-feeding device will be more readily appreciated with reference to Figs. 2 and 3. As shown in Fig. 2, manifolds 2 and 3 communicate with the interior of chamber 11, enclosed by the cylindrical housing 12, through slotted ports 13. The slotted ports 13 extend circumferentially of the housing 12 and are provided at intervals throughout the extent of the manifolds. A shaft 14 is revolvably mounted within the housing 12 and is provided with radially extending plates or blades 15. As a means of sealing the blades 15 against the wall of the housing 12 a rubber sheet 16, or other suitable resilient means, is secured to the blades 15 as by rivets 17 and presses against the wall of the housing 12, as the blades are caused to rotate. In this manner each compartment formed by the blades or plates is sealed from the others after being filled with water and prior to the discharge of the water. A water discharge-collecting conduit 6 is provided at one end with a conventional flange and is attached at the other end to the housing 12. The conduit 6 is secured and sealed about one edge to the under side of the housing 12, while the other three sides extend up and around the housing and define an annular chamber 18 between the wall of the housing and the conduit. The upper end of the conduit is open at 19 and provides an air port for the water discharge conduit. A plate 20 is secured about the top of the housing, as by welding, and extends out over the open upper edge of the water discharge conduit, whereby debris and the like are prevented from falling into the water conduit through the chamber formed between the housing and the conduit walls. As shown more particularly in Fig. 3, the water discharge conduit communicates with the chamber 11, enclosed by the housing 12, through slotted ports 21, which extend circumferentially from the lower side of the housing to a point 22 well up the side of the housing and provide a means whereby water may discharge readily from each compartment formed by the vanes 15 as the shaft 14 is caused to revolve. The housing 12 is provided with flanged ends 23 and 24 to which are secured cover plates 25 and 26 as by means of bolts 27. The cover plate 25 is provided with a sealed bearing designated generally by numeral 28 in which shaft 14 is rotatably mounted. Cover plate 26 is also provided with a bearing 29 through which shaft 14 extends. A follower 30, secured to the bearing 29 by means of bolts 31, extends into a recess formed in the bearing and provides a conventional packing gland assembly. A gear or sprocket 32, which may be keyed or otherwise secured to shaft 14, serves as a means whereby the shaft may be actuated to feed the water at the desired rate.

In Fig. 4 the separate water and air manifolds 2 and 3 of Fig. 2 have been modified and combined so as to form a single continuous chamber 33. Although it has been found preferable to provide separate air and water manifolds such as illustrated in Fig. 2, since more satisfactory operation at large capacities is obtained, a single chamber provided with a water inlet and air vent as shown may be employed. The separate chambers or manifolds are more satisfactory at higher rates of flow because the air can escape more readily and thus a more constant flow of fluid is obtained.

The operation of the device will be best understood in connection with the feeding of water for the production of a neat cement slurry. Cement is started to the mixing chamber 8 by means of conveyer 9 and at the same time shaft 14 is caused to rotate, whereby water is also forwarded to the mixing chamber. The volume of water being forwarded is regulated to produce a slurry of the desired density which depends, of course, upon the fluidity desired and upon the type of cement being employed. As shown, the direction of rotation of the shaft and metering blades or vanes 15 is in a counterclockwise direction (as viewed in Fig. 2). This direction of rotation is preferable since it allows the water to start filling each compartment from the bottom and allows air to escape readily from the top of each compartment, through air vent pipe 5, substantially eliminating the possibility of air being trapped by the water when the revolvable element is rotating at relatively high speeds.

The slotted ports 21 through which water discharges into the water-gathering conduit 6 should extend circumferentially around the housing to a point at least adjacent the horizontal axis and preferably to a point well up toward the top of the housing to insure that complete discharge of water occurs at rapid rotational speeds.

It is preferable to provide a port, as at 19, for entry of air into the compartments discharging water into the collecting conduit 6 since this allows the compartments to more completely discharge their supply of water. For a satisfactory operation, the unslotted or solid sections of the housing 12 occurring above the air vent manifold 3 and below the water inlet manifold 2 must be of such extent as to at least equal the distance between the ends of any two consecutive metering blades or vanes in order that direct communication is not afforded at any time between the point of water entry and water discharge or between the two points provided for entry of air to the chamber. This type of construction is necessary for otherwise water would be able to flow directly from the water inlet into the discharge conduit without depending on the rotational movement of the blades for forwarding action.

A preferred construction of the rotating compartment forming vanes or blades consists in edging the blades with a sheet of rubber or similar resilient material in such a manner that the rubber extends from the blades and contacts the housing as the blades rotate. The rubber-edged blades contacting the housing provide a flexible and effective seal of much simpler construction than can be had if an attempt is made to accurately machine the metal housing and blades in order that the blades rotate in the housing at minimum tolerances. It will be apparent that air vent stack 5 must be provided of such a height as to be equal to or greater than the head of water employed.

It may be desirable to operate the water-feeding device and the cement-forwarding means from a common power source so that increasing the rate of introduction of dry cement also increases the rate of flow of water to the cement mixer a proportionate amount thus producing a slurry of constant density.

When operating the water-feeding device and the cement-forwarding means from a common power source, it is usually desirable to provide means whereby one may be varied in relation to the other in order that slurries of different densities may be made as is necessary and desirable when using cements of different manufacture, type, and properties. In this manner once the proper relation of cement to water is established for a particular cement, neat slurry can be produced at widely varying rates because increasing the rate of introduction of the dry cement is accompanied by corresponding increase in water input such that the resulting slurry is of substantially constant density.

Thus, the improved water-feeding device is highly suitable for use in conjunction with cement mixers which must be operated at widely varying rates of speed to produce a neat cement slurry of closely controlled density. It is especially suitable for use in cement-mixing combinations wherein the water-feeding device and the cement-forwarding means are synchronously driven from a common power source at widely varying rates of speed, since the amount of water delivered every complete revolution is substantially the same over a relatively wide range of operating conditions.

We claim:

1. In a water-feeding device for delivering water to a cement mixer, the combination which includes a cylindrical housing closed at both ends, a member revolvably mounted in said housing adapted to divide the interior of the housing into compartments, a water supply chamber communicating with the interior of the housing through an opening therein, an air-vented chamber directly above the water supply chamber and separate from the water supply chamber communicating with the interior of the housing through an opening therein directly above that of the water supply chamber, a water-collecting conduit attached to the bottom portion of said housing and communicating with the interior of the housing, and a vent communicating with the water collecting conduit and the upper portion of the interior of the housing.

2. In a water-feeding device for delivering water to a cement mixer, the combination which includes a cylindrical housing closed at both ends, a shaft longitudinally and revolvably mounted in said housing, plate members secured to said shaft extending radially therefrom toward the walls and ends of the housing, resilient means affixed to said plates and extending to the walls and ends of the housing in sealing relation whereby the interior of the housing is divided into a series of compartments, a water supply chamber and a superposed air-vented chamber separately sealed to the side of said housing and communicating with the interior of the housing and indirectly with each other through slotted ports extending circumferentially around the housing adjacent the water chamber and the air chamber, and an air-vented water discharge collecting conduit attached to the lower portion of said housing and communicating with the interior of the housing through ports therein.

3. In a water-feeding device for delivering water to a cement mixer, the combination which includes a cylindrical housing closed at both ends, a shaft longitudinally and revolvably mounted in said housing, plate members attached to said shaft extending radially therefrom toward the walls and ends of the housing, said plates having resilient rubberlike sheets affixed thereto extending to the walls and ends of the housing in sealing relation whereby the interior of the housing is divided into a series of compartments, a water supply chamber and a superposed air-vented chamber, separately sealed to said housing and communicating with the interior of the housing and indirectly with each other through slotted ports extending around the housing adjacent said water and air chambers, and a water discharge collecting conduit secured to the bottom of said housing with a portion thereof extending circumferentially around the housing and separated therefrom so as to define an annular chamber between the housing and the conduit with an opening at the upper end, said water conduit communicating with the interior of the housing through slotted ports provided adjacent the water discharge conduit.

4. In a water-feeding device for delivering water to a cement mixer, the combination which includes a cylindrical housing closed at each end, a shaft longitudinally and revolvably mounted in the ends of said housing, plate members secured to said shaft extending radially therefrom toward the walls and ends of the housing, resilient means affixed to said plates and extending to the walls and ends of said housing in sealing relation whereby the interior of the housing is divided into a series of compartments, a water supply chamber, and a superposed air-vented chamber separately sealed to said housing and communicating with the interior of the housing and indirectly with each other through slotted ports extending circumferentially around the housing adjacent the said water and air chambers, and an air-vented water-collecting conduit attached to the bottom of said housing and communicating with the interior of the housing through slotted ports formed therein, said housing having solid unslotted portions between the water supply chamber and water collecting conduit and also between the air chamber and the water collecting conduit of a width such that, as the compartment forming means are positioned adjacent the unslotted sections, the compartment formed thereby is sealed from adjoining compartments.

5. In a water-feeding device for delivering water to a cement mixer, the combination which includes a cylindrical housing closed at each end, a shaft longitudinally and revolvably mounted in the ends of said housing, plate members secured to said shaft extending radially therefrom towards the walls and ends of the housing, resilient rubber-like means affixed to said plates and extending to the walls and ends of said housing in sealing relation whereby the interior of the housing is divided into a series of compartments, a chamber sealed to the side of said housing communicating with a water supply line and an air vent line, said chamber also communicating with the interior of the housing through slotted ports extending circumferentially around the housing adjacent the said chamber, and an air-vented water-collecting conduit attached to the bottom of said housing and communicating with the interior of the housing through slotted ports formed therein, said housing having solid unslotted portions between the combination water-air chamber and the water collecting conduit of a width such that when the compartment forming means are positioned adjacent the unslotted sections the compartments formed thereby are sealed from adjoining compartments.

NELSON D. GRISWOLD.
WILLIAM J. ZILER.